A. T. HATCH.
Fruit-Pitting Machine.
No. 204,217.    Patented May 28, 1878.
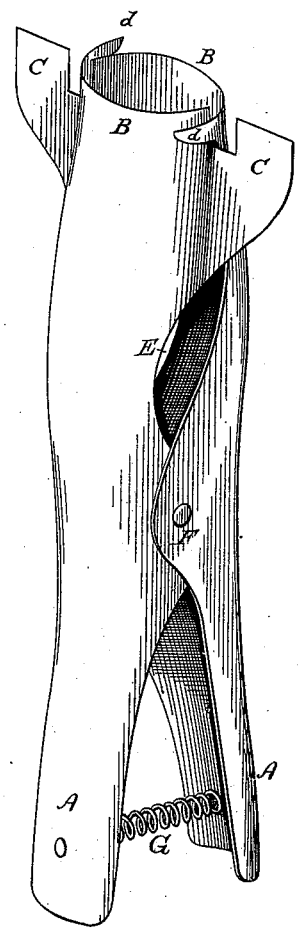
WITNESSES:
Clarence Poole
H. W. Throckmorton
INVENTOR:
Augustus T. Hatch
per Attys.
A. H. Evans & Co.

UNITED STATES PATENT OFFICE.

AUGUSTUS T. HATCH, OF CORDELIA, CALIFORNIA.

IMPROVEMENT IN FRUIT-PITTING MACHINES.

Specification forming part of Letters Patent No. 204,217, dated May 28, 1878; application filed April 1, 1878.

*To all whom it may concern:*

Be it known that I, AUGUSTUS T. HATCH, of Cordelia, county of Solano, and State of California, have invented a Fruit-Pitting Machine; and I do hereby declare the following to be a full, clear, and exact description thereof, reference being had to the accompanying drawing.

My invention relates to a novel device that I call a "Fruit-Pitting Machine," and which is designed to divide the fruit and remove the pit by a single motion, and with but a small amount of waste material, while the fruit will be prepared for drying and preserving in a rapid and simple manner at small expense.

It consists in the construction of a pair of peculiarly-shaped and flanged knives formed on hinged metallic handles, and they are kept in a closed position by a spring placed between the handles.

Referring to the accompanying drawings, Figure 1 is a perspective view of my machine.

A A are the handles, formed of sheet metal, bent in a hollow shape, convenient for handling, and having knives B B made at the lower end by shaping the metal properly; or they may be of a different metal, welded on, if desired. The whole may be struck out and formed into a die. These handles are hinged together at the sides, where a portion of metal, F, projects, forming ears at the central part lengthwise of the machine.

A spring, G, is placed between the handles to keep the knife-blades in position for entering the fruit. These knife-blades are formed with a curved portion, B, to encircle the pit, and a straight portion, C, to divide the fruit, as shown, and they also have extension or guide lips $d\ d$, which work in corresponding slots. By means of these lips and the shape given to the knives the fruit will be cut in pieces and freed from the pit. The latter enters the hollow part above the knife-blades, and is shaken out through openings E, where the metal has been cut away, as shown, the sides being bulged or expanded to allow a clearance.

The operation of my machine will be as follows: The fruit to be preserved or dried is placed on a table with the stem ends downward. The machine is taken by hand and pressed into the upper end of the fruit, and by reason of the shape of the knife-blades they pass around the pit, cutting the fruit in pieces, and removing but a small portion of fruit with the pit. As the spring C causes the blades to hug the pit in passing, the latter is shaken out as the machine is raised, and the pieces of fruit are brushed to one side by hand, the operation being completed in a simple and effective manner, and may be accomplished with speed by a skillful person.

Having thus described my invention, what I claim as new, and desire to secure by Letters Patent, is—

1. A device consisting of the knives having a straight and curved portion, B C, said knives being hinged together at F, and having a closing-spring, the whole operating substantially as and for the purpose herein described.

2. The knives B C, hinged to approach and recede from each other, and provided with the extension guide-lips $d\ d$, substantially as and for the purpose herein described.

In witness whereof I have hereunto set my hand and seal.

AUGUSTUS T. HATCH. [L. S.]

Witnesses:
  H. W. McEWEN,
  CURTIS DRAKE.